(12) United States Patent
Miyake

(10) Patent No.: US 11,445,158 B2
(45) Date of Patent: Sep. 13, 2022

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Toshihisa Miyake, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 16/830,677

(22) Filed: Mar. 26, 2020

(65) Prior Publication Data
US 2020/0314401 A1    Oct. 1, 2020

(30) Foreign Application Priority Data
Mar. 27, 2019 (JP) .............. JP2019-061356

(51) Int. Cl.
*H04N 9/73* (2006.01)
*H04N 9/64* (2006.01)
*H04N 9/79* (2006.01)

(52) U.S. Cl.
CPC ............ *H04N 9/735* (2013.01); *H04N 9/646* (2013.01); *H04N 9/7908* (2013.01)

(58) Field of Classification Search
CPC .................................................. H04N 9/735
USPC .................................................... 348/223.1
See application file for complete search history.

(56) References Cited

U.S. PATENT DOCUMENTS

| 2004/0246350 | A1 | 12/2004 | Sakamoto | |
|---|---|---|---|---|
| 2006/0066736 | A1 | 3/2006 | Tsuruoka | |
| 2013/0201362 | A1 | 8/2013 | Chino | |
| 2013/0222531 | A1* | 8/2013 | Hirai | H04N 5/357 348/32 |
| 2015/0304619 | A1* | 10/2015 | Takasumi | H04N 9/735 348/223.1 |

FOREIGN PATENT DOCUMENTS

| CN | 101282417 A | 10/2008 |
|---|---|---|
| CN | 101489033 A | 7/2009 |
| CN | 101651774 A | 2/2010 |
| CN | 101854469 A | 10/2010 |
| CN | 104023218 A | 9/2014 |
| JP | 3762725 B2 | 4/2006 |
| JP | 2007-259401 A | 10/2007 |

(Continued)

OTHER PUBLICATIONS

European Search Report dated Aug. 13, 2020, that issued in the corresponding European Patent Application No. 20162320.4.

(Continued)

*Primary Examiner* — Joel W Fosselman
(74) *Attorney, Agent, or Firm* — Cowan, Liebowitz & Latman, P.C.

(57) ABSTRACT

There is provided an image processing apparatus. An estimation unit estimates a color difference component of noise included in a captured image that has undergone white balance correction. A determination unit determines a strength of color suppression processing based on a size of the color difference component of the noise. A processing unit applies the color suppression processing to the captured image at the determined strength.

11 Claims, 8 Drawing Sheets

(56) References Cited

FOREIGN PATENT DOCUMENTS

| | | |
|---|---|---|
| JP | 2009-239608 A | 10/2009 |
| JP | 2013-162248 A | 8/2013 |
| JP | 2013-223061 A | 10/2013 |
| JP | 2017-130836 A | 7/2017 |

OTHER PUBLICATIONS

The above documents were cited in a Sep. 9, 2021 Chinese Office Action, a copy of which is enclosed without an English Translation, that issued in Chinese Patent Application No. 202010169666.5.

* cited by examiner

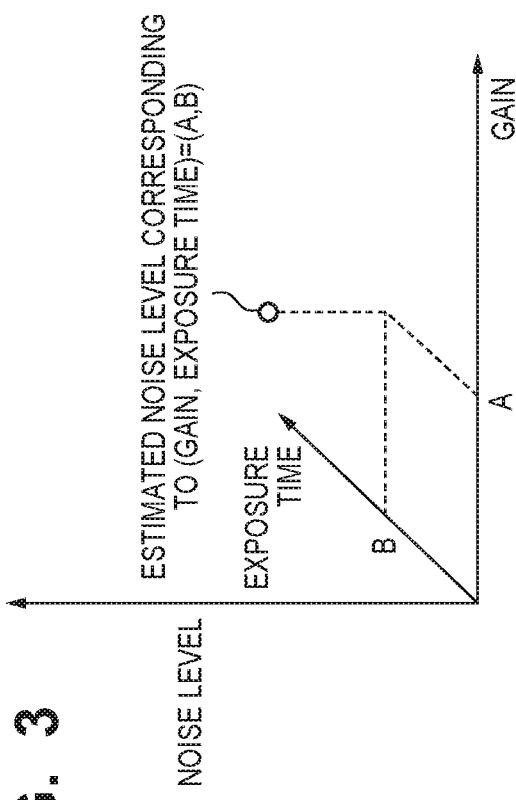
F I G. 3
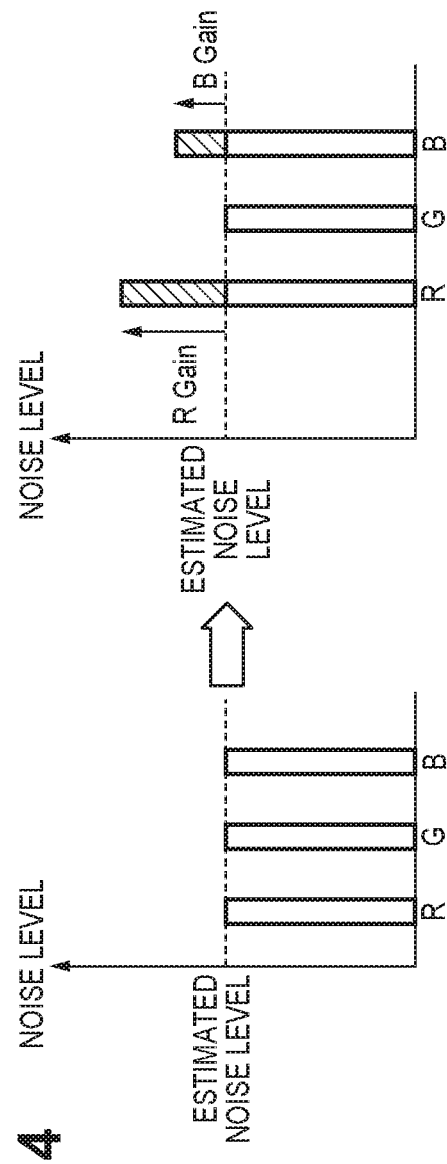
F I G. 4

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

Conventionally, in image capturing apparatuses, controls such as control for suppressing noise caused by gain, temperature, exposure time and the like and control of white balance (WB) correction are performed. In a low light environment, a large gain is sometimes used in order to enhance visibility, although noise caused by the gain also increases in this case. As a result, there is a problem in that the noise component will be dominant in low luminance regions of a captured image, and image quality deteriorates due to the occurrence of coloring caused by the noise.

In order to solve this problem, technologies for performing noise reduction control based on gain are known. For example, Japanese Patent No. 3762725 discloses inferring and suppressing the noise component within a video signal obtained by an image sensor, based on shooting conditions such as gain and exposure time determined based on photometric values, in the case of displaying the video signal. Also, Japanese Patent Laid-Open No. 2013-162248 discloses a technology for suppressing color noise in particular, out of the noise component that occurs. Specifically, deriving the noise level which changes according to exposure time and temperature, calculating the level of color shift corresponding to the derived noise level, and implementing processing for suppressing the color component based on gain is disclosed.

Coloring caused by noise that occurs in low luminance regions changes greatly according to the shooting conditions, particularly, the gain of white balance correction (white balance gain). Coloring caused by noise is also affected by the white balance gain in regions other than low luminance regions. However, the conventional technologies do not take the influence exerted by white balance correction on coloring caused by a noise into consideration.

SUMMARY OF THE INVENTION

The present invention has been made in view of such circumstances, and provides a technology for performing processing for suppressing the color component of a captured image with consideration for the influence exerted by white balance correction on coloring caused by noise.

According to a first aspect of the present invention, there is provided an image processing apparatus comprising: an estimation unit configured to estimate a color difference component of noise included in a captured image that has undergone white balance correction; a determination unit configured to determine a strength of color suppression processing based on a size of the color difference component of the noise; and a processing unit configured to apply the color suppression processing to the captured image at the determined strength.

According to a second aspect of the present invention, there is provided the image processing apparatus according to the first aspect, wherein the captured image is obtained by applying a gain common to all colors and a white balance gain determined for each color to an image signal generated through photoelectric conversion by an image capturing unit, and the estimation unit is configured to estimate the color difference component of the noise, based on the gain and the white balance gains.

According to a third aspect of the present invention, there is provided an image capturing apparatus comprising: the image processing apparatus according to the second aspect; and the image capturing unit.

According to a fourth aspect of the present invention, there is provided an image processing method executed by an image processing apparatus, comprising: estimating a color difference component of noise included in a captured image that has undergone white balance correction; determining a strength of color suppression processing based on a size of the color difference component of the noise; and applying the color suppression processing to the captured image at the determined strength.

According to a fifth aspect of the present invention, there is provided a non-transitory computer-readable storage medium which stores a program for causing a computer to execute an image processing method comprising: estimating a color difference component of noise included in a captured image that has undergone white balance correction; determining a strength of color suppression processing based on a size of the color difference component of the noise; and applying the color suppression processing to the captured image at the determined strength.

Further features of the present invention will become apparent from the following description of exemplary embodiments with reference to the attached drawings.

BRIEF DESCRIPTION OF THE DRAWINGS

FIG. 3 is a conceptual diagram of processing for estimating a noise level.

FIG. 4 is a conceptual diagram of processing for calculating color-specific noise signal estimation values.

DESCRIPTION OF THE EMBODIMENTS

Figure 1:
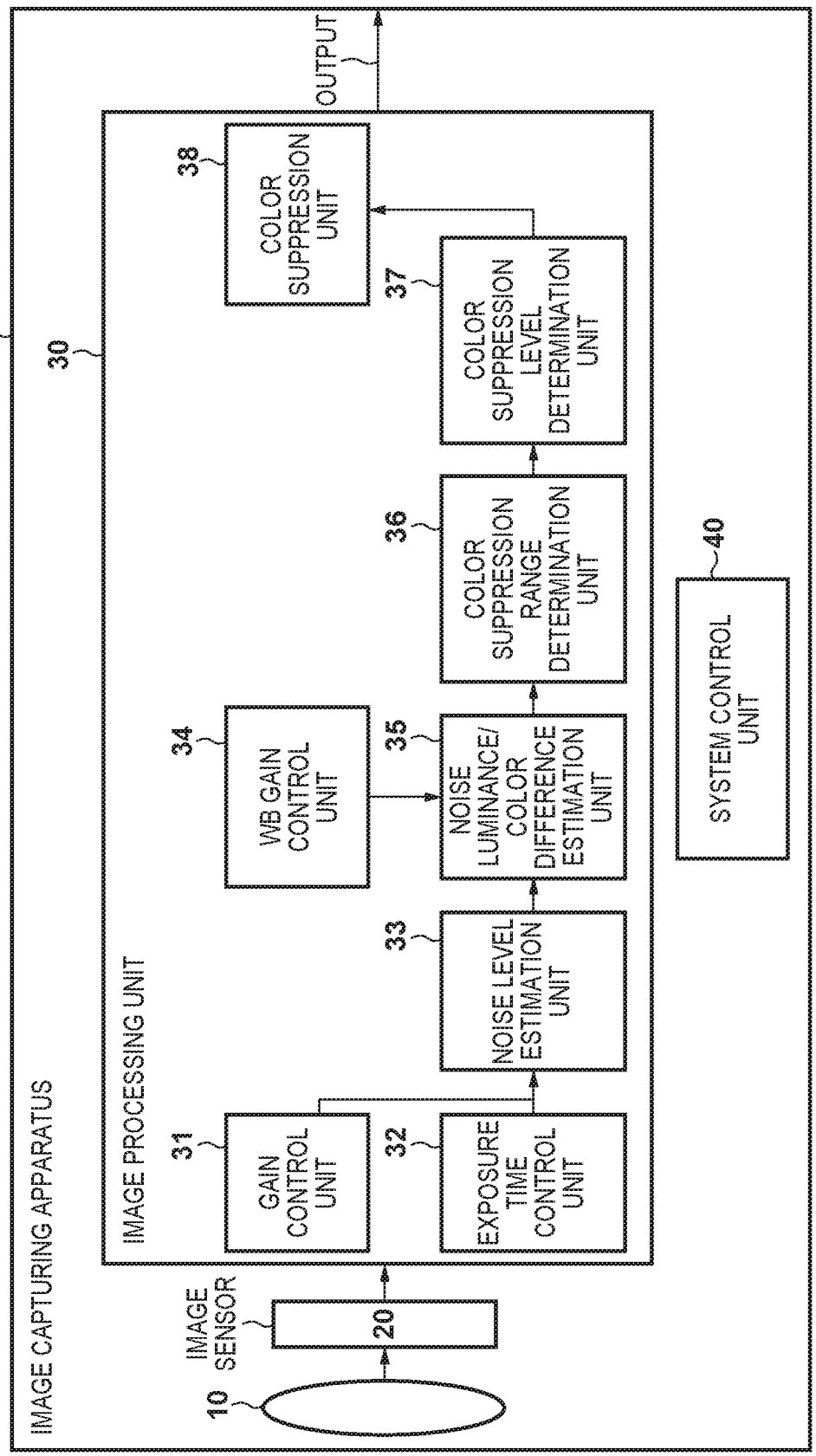
FIG. 1 is a block diagram showing a configuration of an image capturing apparatus 100 that includes an image processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing a configuration of an image capturing apparatus 100 that includes an image processing apparatus. In FIG. 1, light that enters through a lens 10 forms an image on a light receiving surface of an image sensor 20 that is typified by a CCD or CMOS sensor. The image sensor 20 converts the light forming the image into an image signal through photoelectric conversion and outputs the image signal. An image processing unit 30 performs various types of image processing such as color conversion, AE processing, white balance correction (WB correction), and gamma processing for performing tone conversion on the image signal output by the image sensor 20. A system control unit 40 includes a ROM in which a control program is stored and a RAM that is used as a work memory, and performs overall control of the image capturing apparatus 100 by executing the control program.

In the image processing unit 30, a gain control unit 31 determines the gain to be applied to the image signal generated through photoelectric conversion by the image sensor 20, and applies the determined gain to the image signal. An exposure time control unit 32 determines the exposure time, and performs exposure time control on the image sensor 20. A noise level estimation unit 33 estimates the level (noise level) of noise that is included in the captured image, based on the gain determined by the gain control unit 31. Note that the noise level is affected by various shooting conditions including gain. Exposure time is given as an example of a shooting condition that affects the noise level. Accordingly, the noise level estimation unit 33 may estimate the noise level based on the exposure time determined by the exposure time control unit 32, in addition to the gain determined by the gain control unit 31.

A WB gain control unit 34 determines the gain (white balance gain) for each color of the image signal, such that an appropriate white balance is obtained in the image signal. That is, the gain of the gain control unit 31 is common to all colors, whereas the white balance gain (WB gain) is determined for each color. The WB gain control unit 34 performs signal processing (WB correction) for applying the WB gain determined for each color to the image signal.

A noise luminance/color difference estimation unit 35 estimates the luminance component and color difference component of noise (noise included in the captured image) that is actually output, by applying the color-specific WB gains determined by the WB gain control unit 34 to the noise level estimated by the noise level estimation unit 33.

A color suppression range determination unit 36 determines a luminance range for applying processing for suppressing the color component (color suppression processing), based on the luminance component of noise estimated by the noise luminance/color difference estimation unit 35. A color suppression level determination unit 37 determines the strength of color suppression processing, based on the color difference component of noise estimated by the noise luminance/color difference estimation unit 35. A color suppression unit 38 applies color suppression processing at the strength determined by the color suppression level determination unit 37 to pixels having a luminance within the luminance range determined by the color suppression range determination unit 36, out of the pixels of the captured image that has undergone white balance correction.

Figure 2:
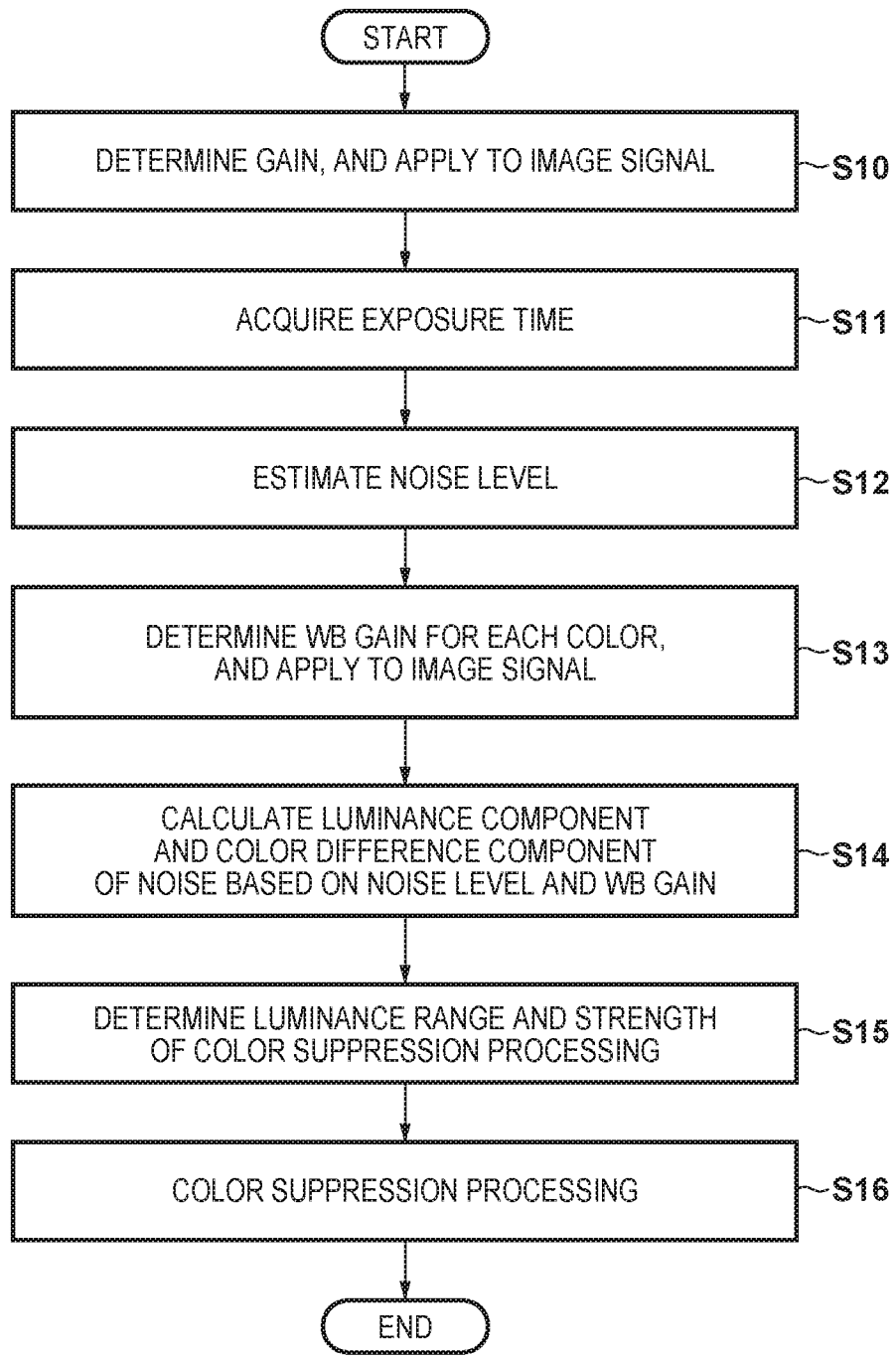
FIG. 2 is a flowchart of image processing according to a first embodiment.

FIG. 2 is a flowchart of image processing according to the first embodiment. The processing of this flowchart starts when an image signal generated through photoelectric conversion by the image sensor 20 is input to the image processing unit 30.

In step S10, the gain control unit 31 determines a gain common to all colors, and applies the determined gain to the image signal. In step S11, the exposure time control unit 32 acquires the exposure time of the image signal. In step S12, the noise level estimation unit 33 estimates the noise level based on the gain determined in step S10. Note that the noise level estimation unit 33 may estimate the noise level based on the exposure time acquired in step S11, in addition to the gain determined in step S10.

FIG. 3 is a conceptual diagram of processing for estimating the noise level. As shown in FIG. 3, the noise level corresponding to the gain and exposure time is estimated.

Returning to FIG. 2, the WB gain control unit 34, in step S13, determines the WB gain for each color of the image signal, and applies the determined WB gains to the image signal. In step S14, the noise luminance/color difference estimation unit 35 calculates a noise signal estimation value for each color based on the noise level and the WB gains. The noise luminance/color difference estimation unit 35 then calculates an estimated noise luminance value (luminance component of noise) and an estimated noise color difference value (color difference component of noise) from the calculated color-specific noise signal estimation values.

FIG. 4 is a conceptual diagram of processing for calculating the color-specific noise signal estimation values. The noise that occurs in the image signal that is generated by the image sensor 20 is an electrical signal, and the gain of the gain control unit 31 is common to all colors. Thus, as shown on the left side of FIG. 4, color-specific differences do not occur in the noise level that is estimated by the noise level estimation unit 33. On the other hand, WB gain is determined for each color. Thus, as shown on the right side of FIG. 4, the noise signal estimation value may differ for every color, and coloring of noise may occur. The noise luminance/color difference estimation unit 35 calculates the luminance component and color difference component of noise from such color-specific noise signal estimation values.

Note that, as can be seen from processing of steps S12 and S14, the noise level is estimated based on the gain of the gain control unit 31, and the luminance component and color difference component of noise are calculated based on the noise level and WB gains. Accordingly, as the overall processing of steps S12 and S14, the luminance component and color difference component of noise that are included in the captured image that has undergone white balance correction are estimated based on the gain common to all colors and the WB gain determined for each color.

Returning to FIG. 2, the color suppression range determination unit 36, in step S15, determines the luminance range for applying color suppression processing, based on the size of the luminance component of noise. Also, the color suppression level determination unit 37 determines the strength of color suppression processing, based on the size of the color difference component of noise.

Figure 5:
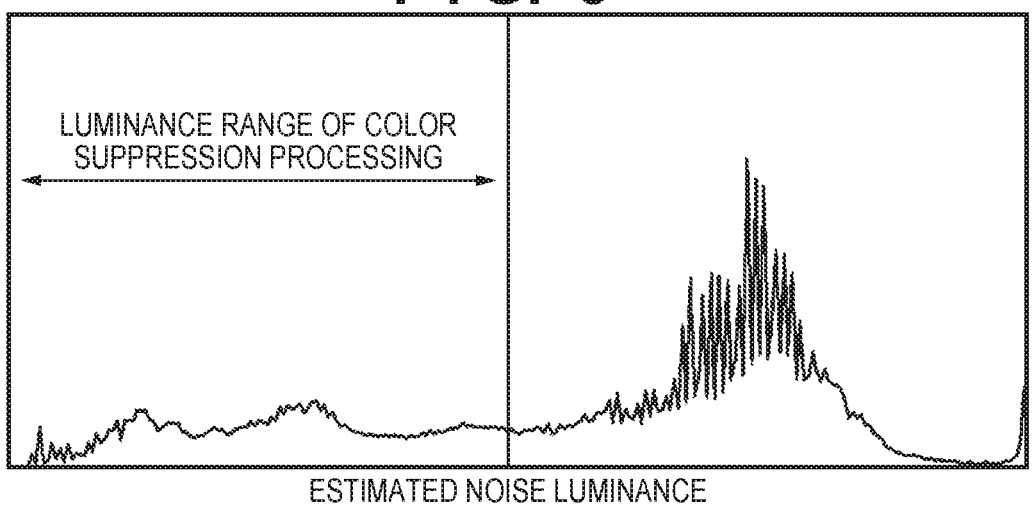
FIG. 5 is a conceptual diagram of processing for determining a luminance range for applying color suppression processing.

FIG. 5 is a conceptual diagram of processing for determining the luminance range for applying color suppression processing. A range of luminance less than or equal to the estimated noise luminance (range of luminance less than or equal to the size of the luminance component of noise) is determined as the luminance range for applying color suppression processing. Note that the luminance range for applying color suppression processing may be a range of luminance less than the estimated noise luminance (range of luminance less than the size of the luminance component of noise). By determining the luminance range of color suppression processing in this way, it becomes possible to apply color suppression processing to low luminance regions in which coloring caused by noise is noticeable.

Figure 6:
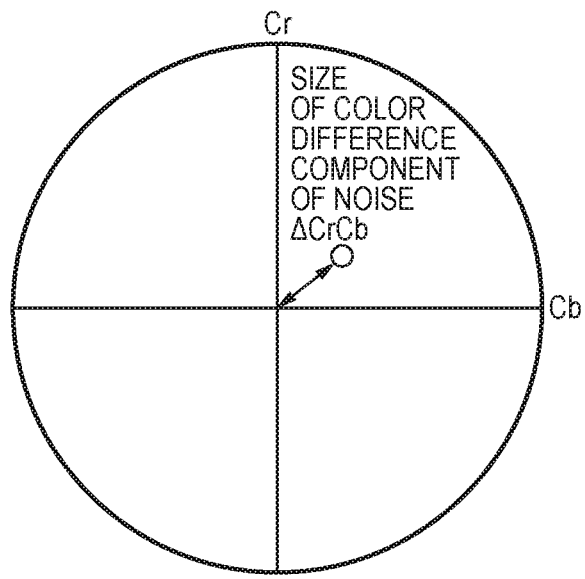
FIG. 6 is a conceptual diagram of a size $\Delta CrCb$ of a color difference component of noise.

FIG. 6 is a conceptual diagram of a size $\Delta CrCb$ of the color difference component of noise. $\Delta CrCb$ is calculated in accordance with the following equation (1).

$$\Delta CrCb = \sqrt{(Cr^2 + Cb^2)} \quad (1)$$

Here, Cr and Cb are estimated noise color difference values (color difference component of noise) calculated by the noise luminance/color difference estimation unit 35 in step S14. The degree of coloring caused by noise can be determined, by deriving the size $\Delta CrCb$ of the color difference component of noise.

Figure 7:
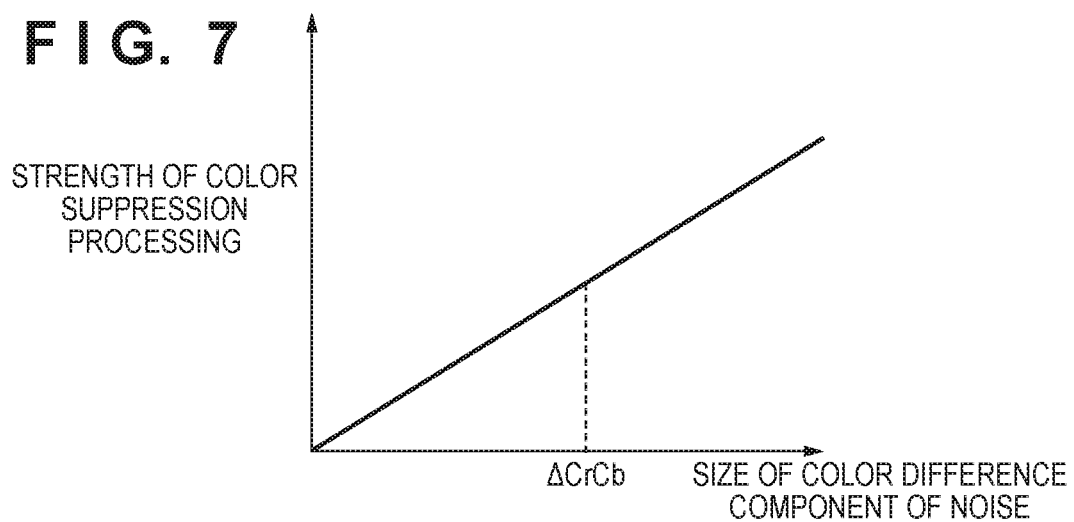
FIG. 7 is a conceptual diagram of processing for determining a strength of color suppression processing.

FIG. 7 is a conceptual diagram of processing for determining the strength of color suppression processing. As shown in FIG. 7, the strength of color suppression processing changes, according to the size $\Delta CrCb$ of the color difference component of noise.

Returning to FIG. 2, the color suppression unit 38, in step S16, applies color suppression processing to the captured image that has undergone WB correction. Color suppression processing is performed at the strength determined in step S15 on pixels having a luminance within the luminance range determined in step S15, out of the pixels of the captured image.

As described above, according to the first embodiment, the image capturing apparatus 100 acquires a captured image, by applying the gain common to all colors and the WB gain determined for each color to an image signal that is generated through photoelectric conversion by the image sensor 20 (steps S10 and S13 of FIG. 2). The image capturing apparatus 100 then estimates the luminance component and color difference component of noise included in the captured image, based on the gain common to all colors and the WB gain determined for each color (steps S12 and S14 of FIG. 2). The image capturing apparatus 100 then determines the luminance range for applying color suppression processing, based on the size of the luminance component of noise, and determines the strength of color suppression processing, based on the size of the color difference component of noise. The image capturing apparatus 100 then applies color suppression processing at the determined strength to pixels having a luminance within the determined luminance range, out of the pixels of the captured image. It thereby becomes possible to perform processing for suppressing the color component of a captured image with consideration for the influence exerted by WB correction on coloring caused by noise.

Note that the image capturing apparatus 100 may be configured to not determine a luminance range for applying color suppression processing, and to apply color suppression processing to a captured image regardless of luminance. In this case, although color suppression processing is also applied to high luminance regions in which coloring caused by noise is not that noticeable, the influence exerted by WB correction on coloring caused by noise is still being taken into consideration in color suppression processing.

Also, although, in the example of FIG. 7, the strength of color suppression processing is also higher as the size of the color difference component of noise increases, the specific relationship between the size of the color difference component of noise and the strength of color suppression processing is not particularly limited. As long as the strength of color suppression processing is determined based on the size of the color difference component of noise, the influence exerted by WB correction on coloring caused by noise is still being taken into consideration in color suppression processing.

Second Embodiment

A second embodiment describes a configuration for determining a color difference range for applying color suppression processing, and applying color suppression processing to pixels having a color difference within the determined color difference range, out of the pixels of the captured image. In this embodiment, the basic configuration of the image capturing apparatus 100 is similar to the first embodiment (refer to FIG. 1). Hereinafter, description will focus on the differences from the first embodiment.

Figure 8:
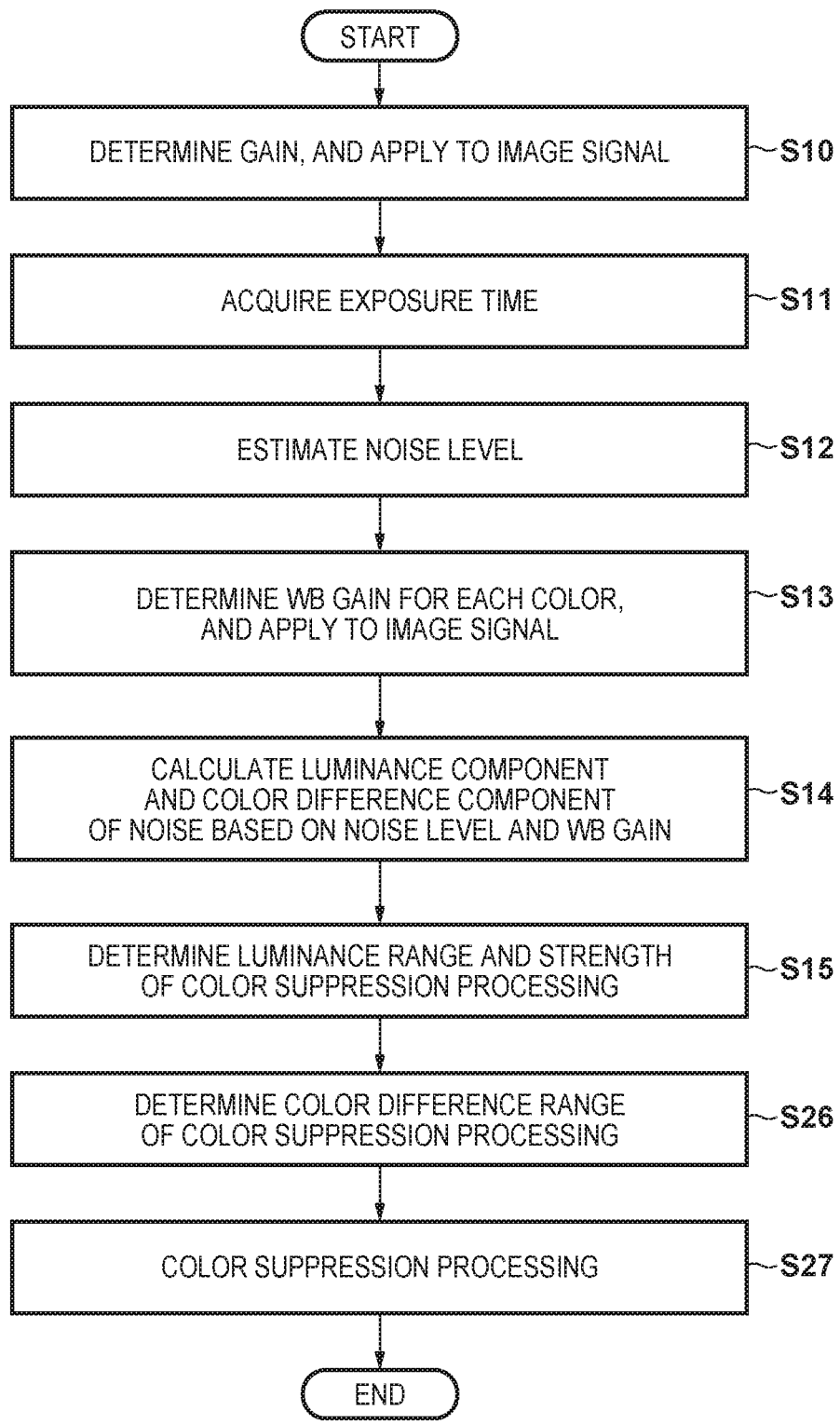
FIG. 8 is a flowchart of image processing according to a second embodiment.

FIG. 8 is a flowchart of image processing according to the second embodiment. In FIG. 8, the same reference signs as FIG. 2 are given to steps in which the same or similar processing as FIG. 2 is performed, and description thereof will be omitted. The processing of this flowchart starts when an image signal generated through photoelectric conversion by the image sensor 20 is input to the image processing unit 30.

In step S26, the color suppression range determination unit 36 determines the color difference range for applying color suppression processing, based on the color difference component of noise calculated in step S14.

Figure 9:
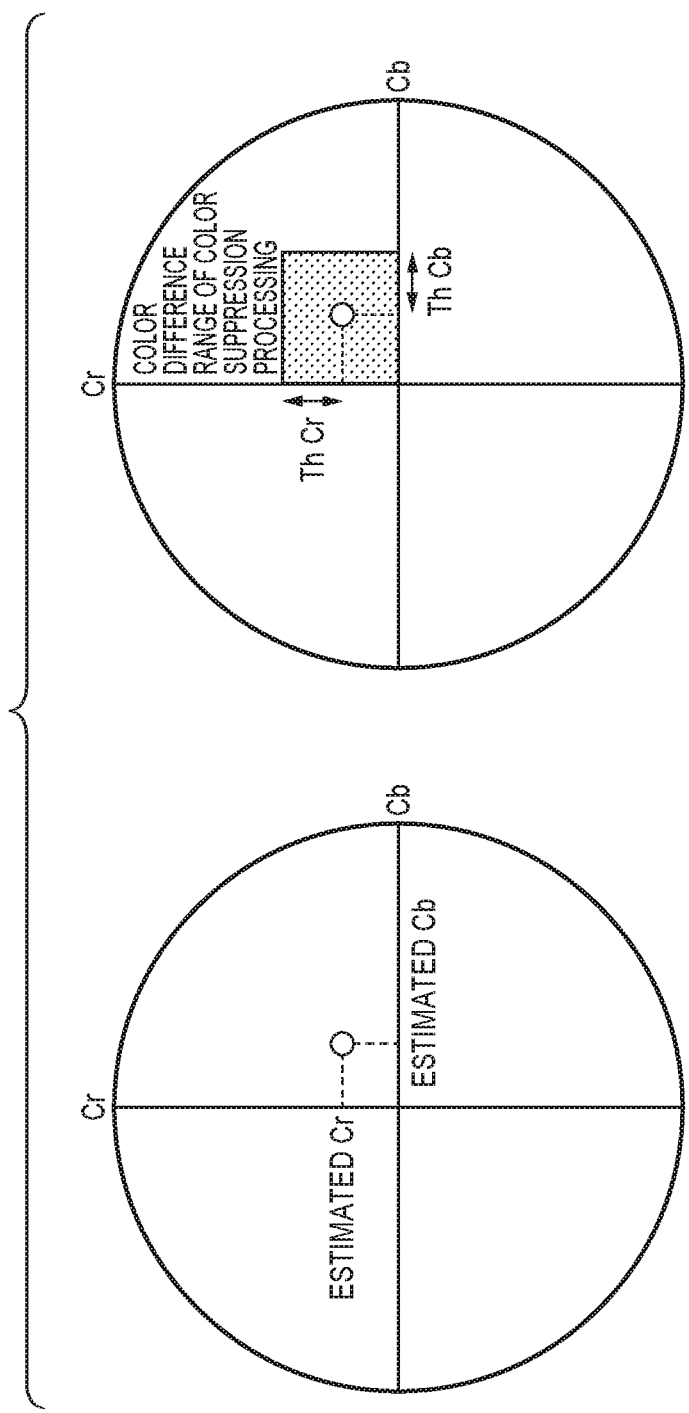
FIG. 9 is a conceptual diagram of processing for determining a color difference range for applying color suppression processing.

FIG. 9 is a conceptual diagram of processing for determining the color difference range for applying color suppression processing. A range of color difference near the color difference component of noise is determined as the color difference range for applying color suppression processing. "Near" as referred to here is a range in which the possibility of the color difference of pixels of the captured image being caused by the color difference component of noise is considered to be high, and can, for example, be determined using threshold values ThCr and ThCb as shown in FIG. 9. That is, in the example in FIG. 9, the case where the color difference satisfies 0≤estimated Cr≤estimated Cr+ThCr and 0≤estimated Cb≤estimated Cb+ThCb is determined as the color difference range for applying color suppression processing.

Note that the color difference range for applying color suppression processing is not limited to a range of color difference near the color difference component of noise, as long as determination of the color difference range is based on the color difference component of noise.

Returning to FIG. 8, the color suppression unit 38, in step S27, applies color suppression processing to the captured image that has undergone WB correction. Color suppression processing is performed at the strength determined in step S15 on pixels having a luminance within the luminance range determined in step S15 and having a color difference within the color difference range determined in step S26, out of the pixels of the captured image.

As described above, according to the second embodiment, the image capturing apparatus 100 determines the color difference range for applying color suppression processing, based on the color difference component of noise included in a captured image that has undergone WB correction. The image capturing apparatus 100 then applies color suppression processing to pixels having a color difference within the determined color difference range, out of the pixels of the captured image. It thereby becomes possible to perform processing for suppressing the color component of a captured image with consideration for the influence exerted by WB correction on coloring caused by noise.

Third Embodiment

The first embodiment described a configuration for estimating the luminance component and color difference component of noise that are included in a captured image, based on a gain common to all colors and a WB gain determined for each color. However, the method of estimating the luminance component and color difference component of noise is not limited to the method described in the first embodiment. A third embodiment describes a configuration for estimating the luminance component and color difference component of noise, based on the pixel values of a region of the captured image that corresponds to a shaded region, or the pixel values of a partial region of the captured image that is selected in accordance with a user instruction.

Figure 10:
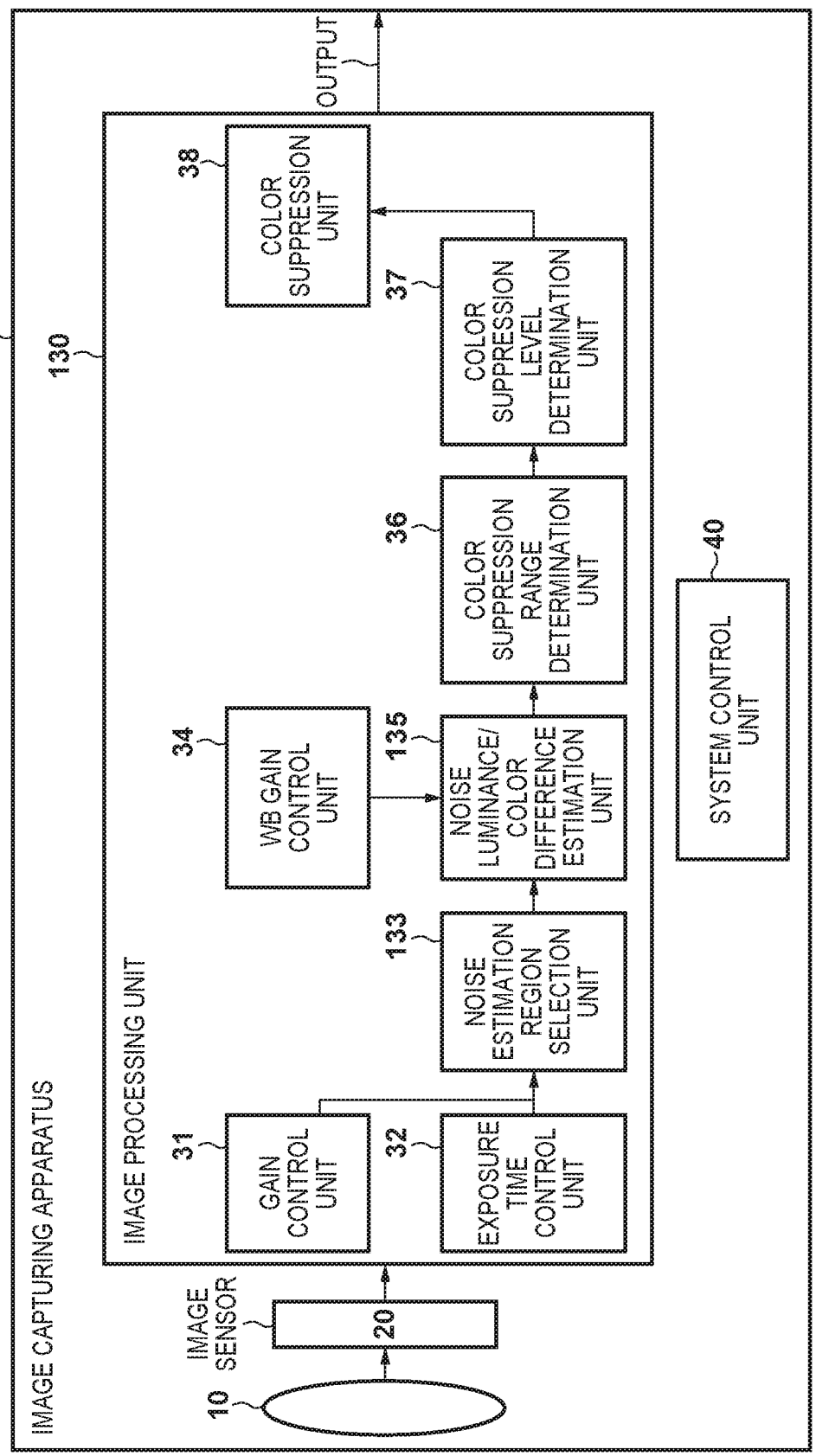
FIG. 10 is a block diagram showing a configuration of an image capturing apparatus 200 that includes an image processing apparatus.

FIG. 10 is a block diagram showing a configuration of an image capturing apparatus 200 that includes an image processing apparatus. The image capturing apparatus 200 differs in comparison to the image capturing apparatus 100 shown in FIG. 1 in being provided with an image processing unit 130 instead of the image processing unit 30. Also, the image processing unit 130 differs in comparison to the image processing unit 30 in being provided with a noise estimation region selection unit 133 and a noise luminance/color difference estimation unit 135 instead of the noise level estimation unit 33 and the noise luminance/color difference estimation unit 35. Hereinafter, description will focus on the differences from the first embodiment.

The noise estimation region selection unit 133 selects a region (noise estimation region) for performing noise estimation in the captured image. For example, the noise estimation region selection unit 133 may select a region corresponding to a shaded region of the image sensor 20 in the captured image, or may select a partial region of the captured image in accordance with a user instruction. In the case of the latter, the user instructs that a low luminance region in the captured image be selected. The noise luminance/color difference estimation unit 135 estimates the luminance component and color difference component of noise, based on the pixel values of the noise estimation region of the captured image. For example, the noise luminance/color difference estimation unit 135 calculates luminance values and color difference values from the pixel values of the noise estimation region of the captured image, and uses the calculated luminance values and color difference values as estimation values of the luminance component and color difference component of noise.

Figure 11:
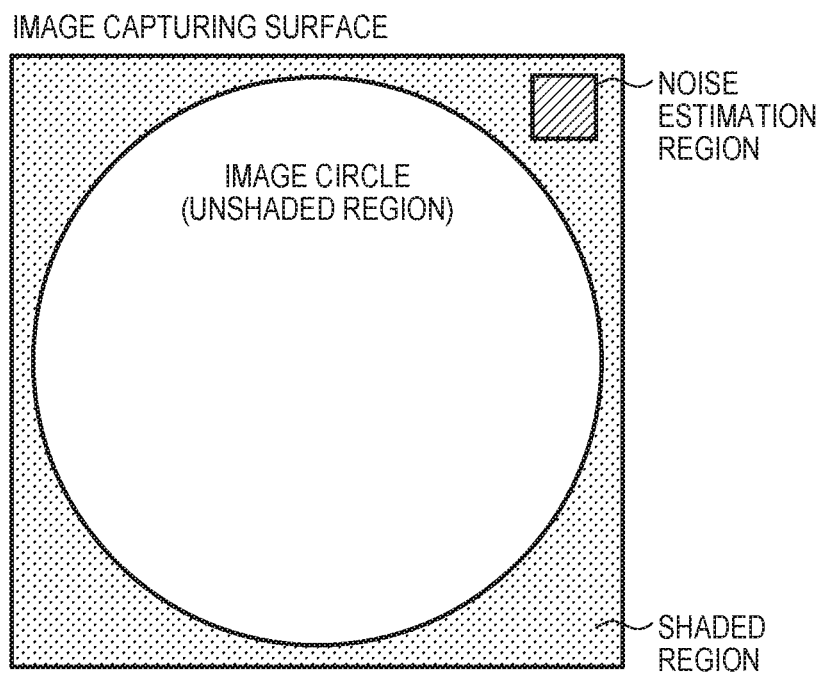
FIG. 11 is a conceptual diagram showing a shaded region and an unshaded region of an image sensor 20.

FIG. 11 is a conceptual diagram showing a shaded region and an unshaded region of the image sensor 20. In the case where an image circle that is formed by light that enters through the lens 10 is smaller than the image capturing surface of the image sensor 20, the region (shaded region) other than the image circle does not receive light. Accordingly, it is possible to regard the pixel values of the region of the captured image that corresponds to the shaded region as noise, by selecting the shaded region as the noise estimation region.

Figure 12:
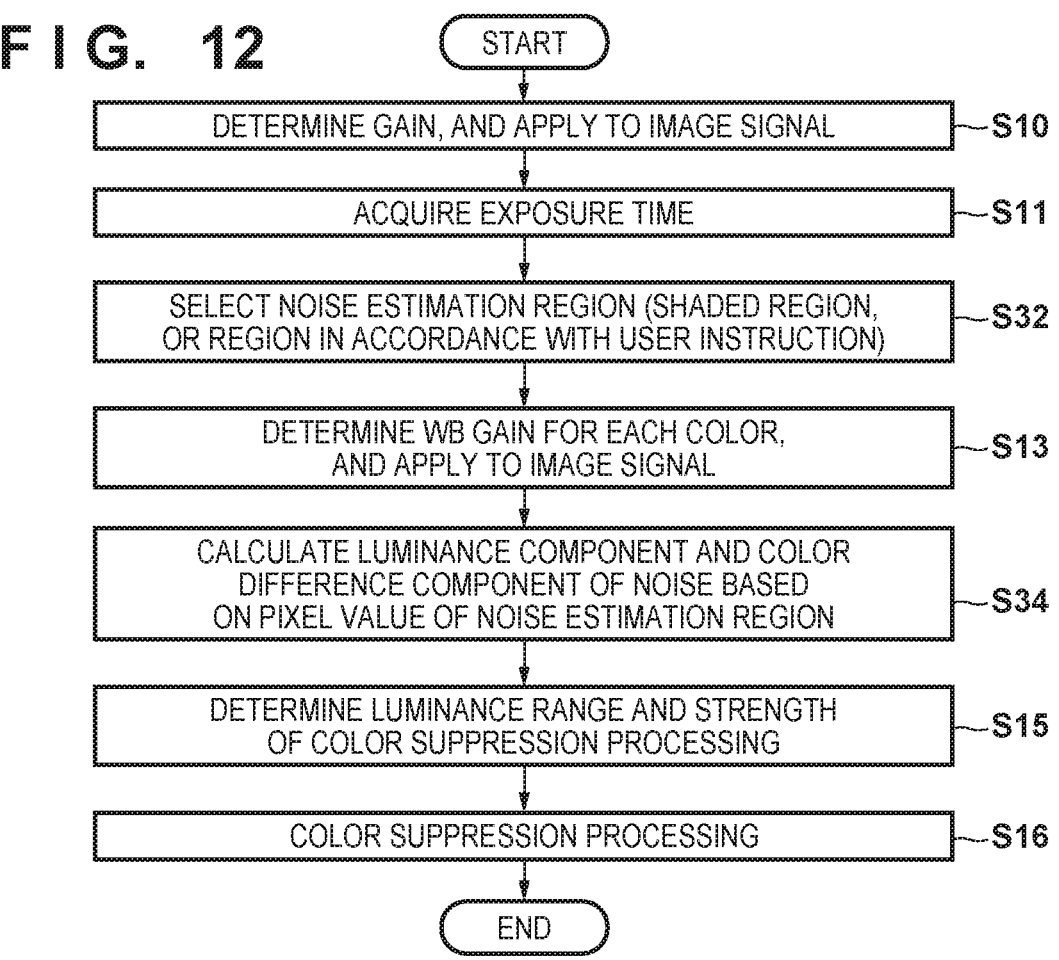
FIG. 12 is a flowchart of image processing according to a third embodiment.

FIG. 12 is a flowchart of image processing according to the third embodiment. In FIG. 12, the same reference signs as FIG. 2 are given to steps in which the same or similar processing as FIG. 2 is performed, and description thereof will be omitted. The processing of this flowchart starts when an image signal generated through photoelectric conversion by the image sensor 20 is input to the image processing unit 130.

In step S32, the noise estimation region selection unit 133 selects a noise estimation region of the captured image. As aforementioned, the noise estimation region selection unit 133 may select a region corresponding to a shaded region of the image sensor 20 in the captured image, or may select a partial region of the captured image in accordance with a user instruction. In step S34, the noise luminance/color difference estimation unit 135 estimates the luminance component and color difference component of noise, based on the pixel values of the noise estimation region of the captured image.

As described above, according to the third embodiment, the image capturing apparatus 200 estimates the luminance component and color difference component of noise, based on the pixel values of a region of the captured image that corresponds to a shaded region, or the pixel values of a partial region of the captured image selected in accordance with a user instruction. In this way, it is also possible to estimate the luminance component and color difference component of noise with a different method from the method described in the first embodiment.

Other Embodiments

As an image capturing apparatus that is used in the above embodiments, it is also possible to use surveillance cameras, cameras for industrial and factory use and medical cameras, other than so-called general digital still cameras and digital video cameras. With these cameras, image capture in low light may be essential depending on the use application of the camera, and the present invention is useful in such cases. Furthermore, the present invention was described taking an image capturing apparatus that includes an image processing apparatus as an example, but is also applicable to an image processing apparatus that controls an image capturing apparatus by cable or across a wireless network. In this case, the image processing apparatus may receive values of the various gains from the image capturing apparatus, perform estimation of the noise level and determination of the color suppression level, and transmit the color suppression level to the image capturing apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-061356, filed on Mar. 27, 2019, which is hereby incorporated by reference herein in its entirety.

What is claimed is:

1. An image processing apparatus comprising:
at least one processor;
a memory coupled to the at least one processor storing instructions that, when executed by the at least one processor, cause the at least one processor to function as:
an estimation unit configured to estimate a color difference component of noise included in a captured image that has undergone white balance correction, based on a white balance gain determined for each color;
a determination unit configured to determine a strength of color suppression processing based on a size of the color difference component of the noise; and
a processing unit configured to apply the color suppression processing to the captured image at the determined strength.

2. The image processing apparatus according to claim 1, wherein the estimation unit is configured to estimate a luminance component of the noise,
the determination unit is configured to determine a luminance range for applying the color suppression processing, based on a size of the luminance component of the noise, and
the processing unit is configured to apply the color suppression processing to pixels having a luminance within the luminance range, out of pixels of the captured image.

3. The image processing apparatus according to claim 2, wherein the luminance range is a range of luminance less than or equal to the size of the luminance component of the noise or a range of luminance less than the size of the luminance component of the noise.

4. The image processing apparatus according to claim 1, wherein the determination unit is configured to determine a color difference range for applying the color suppression processing, based on a color difference component of the noise, and
the processing unit is configured to apply the color suppression processing to pixels having a color difference within the color difference range, out of pixels of the captured image.

5. The image processing apparatus according to claim 4, wherein the color difference range is a range of color difference near the color difference component of the noise.

6. The image processing apparatus according to claim 1, wherein the captured image is obtained by applying a gain common to all colors and the white balance gain, to an image signal generated through photoelectric conversion by an image capturing unit, and
the estimation unit is configured to estimate the color difference component of the noise, based on the gain and the white balance gain.

7. The image processing apparatus according to claim 1, wherein the captured image is obtained by applying a gain common to all colors and the white balance gain, to an image signal generated through photoelectric conversion by an image capturing unit that includes a shaded region and an unshaded region, and
the estimation unit is configured to estimate the color difference component of the noise, based on pixel values of a region of the captured image that corresponds to the shaded region.

8. The image processing apparatus according to claim 1, wherein the instructions, when executed by the at least one processor, cause the at least one processor to further function as a selection unit configured to select a partial region of the captured image in accordance with a user instruction,
wherein the captured image is obtained by applying a gain common to all colors and the white balance gain, to an image signal generated through photoelectric conversion by an image capturing unit, and
the estimation unit is configured to estimate the color difference component of the noise, based on pixel values of the partial region of the captured image.

9. An image capturing apparatus comprising:
the image processing apparatus according to claim 6; and
the image capturing unit.

10. An image processing method executed by an image processing apparatus, comprising:
estimating a color difference component of noise included in a captured image that has undergone white balance correction based on a white balance gain determined for each color;
determining a strength of color suppression processing based on a size of the color difference component of the noise; and
applying the color suppression processing to the captured image at the determined strength.

11. A non-transitory computer-readable storage medium which stores a program for causing a computer to execute an image processing method comprising:
estimating a color difference component of noise included in a captured image that has undergone white balance correction based on a white balance gain determined for each color;
determining a strength of color suppression processing based on a size of the color difference component of the noise; and
applying the color suppression processing to the captured image at the determined strength.

* * * * *